J. M. ZUK.
SPRING HINGE.
APPLICATION FILED APR. 5, 1912.
1,043,999.
Patented Nov. 12, 1912.
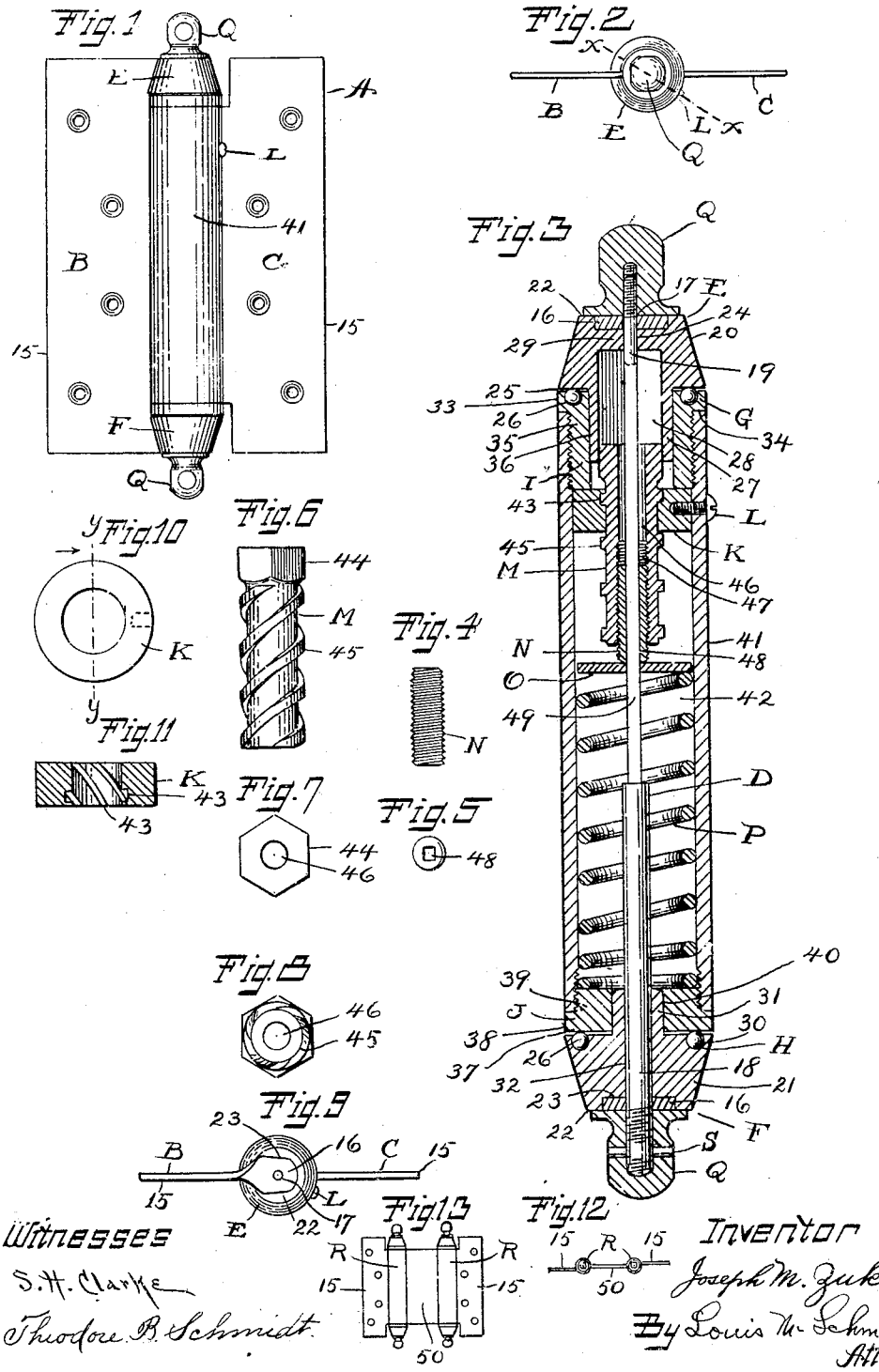

BEST AVAILABLE COPY

UNITED STATES PATENT OFFICE.

JOSEPH M. ZUK, OF NEW BRITAIN, CONNECTICUT.

SPRING-HINGE.

1,043,999.  Specification of Letters Patent.  Patented Nov. 12, 1912.

Application filed April 5, 1912. Serial No. 688,692.

*To all whom it may concern:*

Be it known that I, JOSEPH M. ZUK, a citizen of Russia, residing at New Britain, in the county of Hartford and State of Connecticut, have invented certain new and useful Improvements in Spring-Hinges, of which the following is a specification.

My invention relates to improvements in spring hinges and the object of my improvement is simplicity and economy in construction, and convenience and efficiency in use.

In the accompanying drawings:—Figure 1 is a side elevation of my improved spring hinge. Fig. 2 is a plan view of the same. Fig. 3 is a sectional view on an enlarged scale, on the line x x of Fig. 2. Fig. 4 is a side elevation of the adjusting sleeve. Fig. 5 is a plan view of the same. Fig. 6 is a side elevation of the slide screw. Fig. 7 is a top view of the same. Fig. 8 is a bottom view of the same. Fig. 9 is a view similar to Fig. 2 with the top nut removed. Fig. 10 is a plan view of the slide nut. Fig. 11 is a sectional view of the same on the line y y of Fig. 10. Fig. 12 is a plan view of a double hinge embodying my invention, on a reduced scale. Fig. 13 is a side elevation of the same.

My spring hinge A comprises a left leaf member B and a right leaf member C connected by a pivotal connection and provided with spring means for being closed relatively one to the other and means of adjustment of the spring. The leaf members B and C comprise each a leaf proper 15 of sheet metal of the usual plate-like form and provided with screw holes to receive supporting screws. The left leaf member B comprises the leaf proper 15 and overhanging the lateral edge of the said leaf proper at the upper and lower corners on one side are provided end knuckle portions 16 in the form of a flat plate turned at right angles to the axis, and the said knuckle portions 16 have each an axial hole 17 suitable to receive and a fit for the body portions of the shaft D. The hole 17 that receives the lower shaft portion 18 is larger than the hole 17 that receives the upper shaft portion 19 to correspond to the difference in dimensions of the said shaft portions. The end knuckles are composite structures, comprising each the end knuckle portions 16 and a knuckle body preferably in the form of a casting. The top end knuckle E comprises the end knuckle portion 16 and the body 20 and the bottom end knuckle F comprises the end knuckle portion 16 and the body 21.

The body 20 comprises a truncated conical exterior lateral wall, has the extreme upper surface 22 plane suitable for a bearing surface, is provided on the upper end with a channel 23 that is a fit for the end knuckle portion 16 and is provided with an axial hole 24 in registration with the hole 17 in the upper end portion 16 and which likewise is a fit for the upper portion 19 of the shaft D. The lower side of the body 20 is provided on the outer portion with a plane raceway 25, forming the upper bearing for a set of balls 26 of the upper ball bearing G. Inward from the raceway 25 there is an axial extension 27 in the form of a neck having a cylindrical outer periphery.

An axial chamber 28 extends from the lower end of the neck 27 upwardly into the body portion of the body 20 and has a hexagonal formation for the lateral walls. A bridge or web 29 separates the channel 23 from the chamber 28 and has the hole 24 already referred to which constitutes the bearing for the upper end 19 of the shaft D.

The lower body 21 has a channel 23, to receive the bottom end knuckle portion 16, a bearing end 22, an annular raceway 30, which preferably is grooved to receive the balls 26 of the lower ball bearing H, has an axial extension 31 extending upwardly above the raceway 30 and having a cylindrical outer periphery, and the bearing hole 32 extends through the body portion of the body 21 and neck 31.

As shown the end knuckle portions 16 are wedge shaped and the channels 23 have corresponding converging walls, and the relative dimensions are preferably such that there is an appreciable draw so that pressure will be required to bring the holes 17 in registration with the holes 24 and 32 and permit the insertion of the shaft D, whereby a firm union of the leaf 15 and the bodies 20 and 21 will be effected.

Coöperative ball bearing members are provided comprising an upper end member I for the upper ball bearing G and a lower end member J for the bottom ball bearing H. The upper end member I comprises a cylindrical member having an annular head 33 at the upper end having the upper surface provided with a raceway suitable for receiving the balls 25 and on the lower side an annular shoulder 34 and a neck 35 extending downwardly axially having the exterior threaded and an axial bore 36 that fits the exterior of the neck 27. The lower end member J comprises similarly a head 38 having a raceway 37 preferably plane as shown, and an upwardly extending neck 39 that is threaded on the exterior and has an axial bore 40 that is a fit for the neck 31 of the body portion 21.

The right leaf member C comprises the leaf 15 and an integral intermediate knuckle 41 formed cylindrically and provided with an axial chamber 42, and having the upper and lower ends threaded to receive the end members I and J. The upper portion of the chamber 42 is bridged by the slide nut K, which is preferably located in abutment with the lower end of the member I and is held against rotation and fixed in position by the radial screw L. The slide nut K comprises an annular nut that fits the chamber 42 and is provided axially with an interior thread 43 having a steep pitch or incline and is normally held rigidly in position in the said chamber.

The slide screw M comprises an elongated cylindrical structure having at the upper end a head 44 that is hexagonal in form and a sliding fit for the hexagonal lateral walls of the axial chamber 28 in the upper body 20 and below the said head 44 is provided on the exterior with a screw thread 45 that fits the steep pitch thread 43 of the slide nut K, and is provided with an axial bore 46 which may be threaded or the threaded portion may be confined to approximately the lower half 47 as shown.

The adjusting sleeve N is an elongated cylindrical structure, having the exterior screw threaded to correspond to the screw threaded portion 47 of the slide screw M, and on the interior is pierced by an axial hole 48 that is square in cross-section. Normally the lower end of the adjusting member N extends below the lower end of slide screw M suitably to abut against a bridging washer O.

The bridging washer O fits loosely in the chamber 42, has a hole to fit the shaft D, and is suitable for bearing against the extreme lower end of the adjusting member N and to operatively receive the upper end of the spring P.

The spring P is a coil spring, surrounding the shaft D, suitable for being housed in the chamber 42 between the washer O and the lower cup member J.

The shaft D has the extreme ends threaded and has the lower body portion 18 of relatively large diameter, the upper body portion 19 of smaller diameter, the said upper and lower body portions 18 and 19 being cylindrical and the intermediate body portion 49 adjacent the adjusting member N is square in cross-section and a sliding fit for the square hole 48 in the said adjusting member N.

End nuts Q are screwed onto the ends of the shaft D and have the lower surfaces in engagement with the bearing surfaces 22, and serve to position the shaft D positively relatively to the leaf members B and C. A pin S secures the shaft D to the lower nut Q.

As described, the left leaf member comprises the leaf 15 and the composite end knuckles and the right leaf member comprises the leaf 15 and the composite intermediate knuckle comprising the intermediate knuckle member 41 and the upper and lower members I and J, and they are operatively spaced by the balls 25 of the ball bearings G and H, and the parts mentioned are held positively in operative position by the shaft D.

The spring P is under compression and tends to force the slide screw M upwardly in the slide nut K and movement responsive to such tendency operates to turn the slide screw relatively to the slide nut and through the operation of the head 44 engaged with the extension or neck 28 operates to turn the leaf members B and C relatively one to the other.

Turning the adjusting member N relatively to the slide screw M effects longitudinal movement of the adjusting member N and thereby changes the compression of the spring P and effects the adjustment thereof and such change in adjustment is produced by turning the shaft D by the engagement of the square intermediate portion 49 thereof with the square hole 48 of the adjusting member N. Accordingly, as described, adjustment of tension of the spring and correspondingly of the setting of hinge A is effected by a rotative movement of the shaft D.

The two way hinge shown in Figs. 12 and 13 comprises end leaves 15, and an intermediate leaf 50 connected by a pair of spring hinge connections R each of which comprises the features of spring operation and adjacent parts shown and described in the single hinge A.

I claim as my invention:—

1. A spring hinge comprising a pair of leaf members having intermeshing members comprising a pair of end members and an intermediate member, spring operative mechanism comprising a slide nut secured in the intermediate member and provided with a thread, a slide screw having a thread, a spring bearing against one end of the said screw, and the other end of the said screw held against rotation in one of the said end members, and having free longitudinal movement therein.

2. A spring hinge comprising a pair of leaf members having intermeshing end members and an intermediate member, spring operative mechanism comprising a slide nut secured in the intermediate member and provided with a thread, a slide screw having a thread, a spring bearing against one end of the said screw, the other end of the said screw held against rotation in one of the said end members and provided with means permitting free longitudinal movement in the said end member, and means for adjustment of the tension of the said spring.

3. A spring hinge comprising a leaf member having end knuckles and a second leaf member having an intermediate knuckle, a slide nut fixed in the said intermediate knuckle and a spring housed therein, one of the said end knuckles provided with an axial chamber having polygonal cross-section, a slide screw having a head fitting the said chamber and a body portion having a screw thread operatively engaged with the said slide nut.

4. A spring hinge comprising a leaf member having end knuckles and a second leaf member having an intermediate knuckle, a slide nut fixed in the said intermediate knuckle and a spring housed therein, one of the said end knuckles provided with an axial chamber having polygonal cross-section, a slide screw having a head fitting the said chamber and a body portion having a screw thread operatively engaged with the said slide nut, and an adjusting member intermediate the said slide screw and spring and means for adjusting the relative position of the said slide screw and adjusting member.

5. In a spring hinge comprising leaf members, a spring and a shaft, means of adjustment of the said spring operative by a rotative movement of the said shaft and the said shaft held against axial movement relatively to the said leaf members and the said spring operative as a compression spring.

6. In a hinge comprising a pair of leaf members having intermeshing knuckles, a spring, a slide nut fixed in the intermediate knuckle, a slide screw having threaded engagement with the said nut and a polygonal head, one of the end knuckles provided with a chamber fitting the said head, an adjusting member having screw thread engagement with the said screw and provided with a square hole, a shaft having a square portion fitting the said hole.

JOSEPH M. ZUK.

Witnesses:
SHEFFIELD H. CLARKE,
ROGER EDWARDS.